Patented Nov. 4, 1952

2,616,783

UNITED STATES PATENT OFFICE 2,616,783

PROCESS FOR THE PREPARATION OF SOLID CHLORITE

Ernst Wagner, Konstanz, Germany, assignor to Deutsche Gold- und Silber-Scheideanstalt vormals Roessler, Frankfort-on-the-Main, Germany, a corporation of Germany No Drawing. Application June 6, 1949, Serial No. 97,476. In France June 10, 1948

10 Claims. (Cl. 23—85)

The present invention relates to an improved process for the preparation of solid chlorites and particularly to such a process wherein the chlorite is produced by absorbing chlorine dioxide in an alkaline solution containing a reducing agent.

It is an object of the invention to provide an improved process for the production of solid chlorite in which heat requirements for evaporation of solutions are avoided and in which side reactions leading to undesired by-products are repressed.

It has already been proposed to produce sodium chlorite solutions by permitting chlorine dioxide to react with alkaline, sodium hydroxide or sodium carbonate containing solutions in the presence of a reducing agent such as hydrogen peroxide or zinc. The reactions involved are represented by the following equations:

(1) 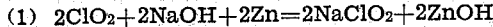
$2ClO_2 + 2NaOH + 2Zn = 2NaClO_2 + 2ZnOH$
(2) 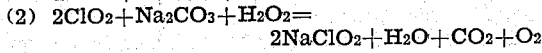
$2ClO_2 + Na_2CO_3 + H_2O_2 = 2NaClO_2 + H_2O + CO_2 + O_2$ In order to obtain solid sodium chlorite from such solutions it was necessary to concentrate such solutions by evaporation to their saturation point. This procedure is not desirable not only because it involves an additional step but because it is inefficient with regard to space and time required as it must be carried out under mild conditions. If the water is evaporated from such solutions at raised temperatures, chlorite losses are inevitable as chlorites tend to decompose in warm solutions. For this reason it has also been proposed to separate the chlorine dioxide from other gases through selective absorption in a NaCl solution at 0° C. and to convert it to a $Ca(ClO_3)_2$ and $Ca(ClO_2)_2$ by treatment with $Ca(OH)_2$. Aside from the troublesome nature of this procedure, only 50% of the chlorine dioxide are converted into the chlorite whereas the other 50% are reconverted into chlorate form.

It has now been found possible to obtain solid chlorite directly with substantially no losses and without evaporation in a continuous process in which chlorine dioxide is absorbed in an alkaline solution. In the process in accordance with the invention chlorine dioxide or chlorine dioxide containing gas mixtures, such as are often obtained because of side reactions and the use of inert gases in the preparation of chlorine dioxide, are passed into an appropriate absorption vessel such as a column containing filling bodies, and in which an absorption solution saturated with a chlorite corresponding to the desired chlorite and containing alkaline reacting agents and a reducing agent is recirculated and constantly supplementing such absorption solution with alkaline reacting agents, preferably in water free form, so that a slight excess of alkali is always present. The water soluble oxides and hydroxides of the alkali and alkaline earth metals and the carbonates and bicarbonates of the alkali metals may be employed as the alkaline reacting agent. These agents may be employed singly or in combination although the cation should be selected to correspond to that of the chlorite to be produced.

It is, of course, also necessary that a certain excess of a reducing agent is constantly present in the absorption solution. Such reducing agents which do not leave disturbing residues such as hydrogen peroxide are especially well suited for the process in accordance with the invention. It is, however, possible to employ alkaline agents which are also reducing agents in the process such as, for example, sodium or barium peroxide. It is also possible to use a combination of reducing agents such as hydrogen peroxide, with alkaline reducing agents such as sodium peroxide.

In the process in accordance with the invention the $ClO_2$ is reduced to the $ClO_2$-ion which then forms the chlorite with the alkaline component of the absorption liquid. Unexpectedly it was found that the resulting supersaturated chlorite solution would not, as was to be feared, crystallize out in the absorption column and cause clogging of such column even though crystallization stimulae such as the filling bodies are present in the column. It was discovered that much stronger crystallization impulses are required to effect the crystallization such as, for example, seeding or the rigorous action of a pump.

The dimensions of the absorption column are preferably selected so that all chlorine dioxide is absorbed in one passage therethrough. It has been found that despite the oily viscosity of the absorption liquid because of the high salt content, the absorption and reduction proceeds with sufficient rapidity that over-dimensioned absorption columns are not required. In order to be certain that all chlorine dioxide is absorbed it is possible to connect a second absorption column in series with the first. As the absorption proceeds with the evolution of heat it is preferable to carry out such absorption with sufficient cooling that undesired decomposition of the chlorite does not occur.

When alkali metal carbonates are introduced into the absorption liquid as the alkaline reactant a temporary light precipitation of the bicarbonate may occur especially if the $ClO_2$ contains $CO_2$. This precipitation, however, does not hinder the production of solid chlorite as the $CO_2$ is driven out by conversion with $ClO_2$. In any event it has been discovered that even when such relatively slow acting alkalis as the alkali metal carbonates or bicarbonates are employed the absorption proceeds with such rapidity that the entire $ClO_2$ is absorbed in only one passage through an absorption column of normal height. It was, furthermore, found desirable to maintain the temperature of the absorption liquid slightly above that of the surrounding atmosphere, for example, between 25° C. and 30° C. when the atmospheric temperature is 20° C. in order to facilitate the recovery of the solid chlorite in a continuous process. This temperature of the absorption liquid is easily achieved through the heat evolved by the absorption of the $ClO_2$. In this manner it is easy to obtain clear saturated or supersaturated chlorite solutions from which solid chlorite may be recovered either by simply permitting them to stand or especially by instigating crystallization through cooling to the surrounding temperature, seeding or stirring. It has been found that the mechanical action of the recirculating pump is especially suited to instigate the crystallization of chlorite from the supersaturated solution so that the crystals may be recovered from the recycled absorption liquid in suitable crystallizing vessels connected after the pump. As soon as the crystallization is ended in such vessels the absorption solution is reintroduced into the absorption column with constant replenishment of the alkaline material as well as the reducing agent which have been used up in the absorption process. The quantity of reducing agent supplied must be sufficient that the well known olive green coloring of the absorption solution, which signifies that the chlorine dioxide is being absorbed without further reaction, is avoided.

The process in accordance with the invention can be carried out in such a manner that the quantity of water in the recycled absorption liquid remains constant so that no additional chlorine dioxide is required to saturate further quantities of water and so that the production of chlorite per unit of time remains substantially constant. For example, the water removed as water of crystallization with $NaClO_2 \cdot 3H_2O$ corresponds to that introduced into the system by the addition of 35% $H_2O_2$. Sodium chloride crystallizes out together with the chlorite depending upon the degree of saturation caused by the presence of chlorine in the $ClO_2$ containing gases absorbed. In some instances, it may be desirable to recover all of the chlorite in the absorption solution periodically by evaporation thereof. However, even in such instances the work expended in such evaporation is not comparable to the expedition of work required in the previously used processes.

The following specific example will serve to illustrate a mode of carrying out the process according to the invention.

*Example*

About 300 liters of a gas mixture containing about 30 liters of $ClO_2$ are introduced into the lower end of an absorption column 40 mm. in diameter and 400 mm. high filled with Raschig rings. Two liters of an absorption solution which is saturated with sodium chlorite and soda are recycled through the column at such a rate that it passes through the column at a rate of about 100 liters per hour. Hydrogen peroxide is constantly added to such absorption solution at a rate that the olive green coloration thereof is just suppressed. Furthermore 90 g. of soda are added to the recirculated solution per hour before it enters the column. The temperature of the recirculated liquid is reduced to 15° C. to 20° C. by cooling.

The recirculation of the absorption liquid is effected through a centrifugal pump. The mechanical action of such pump upon the liquid instigates crystallization of the chlorite and the crystals are removed by continuous filtration through a coarse glass frit filter and the liquid which is freed from such crystals is returned to the absorption column. The salt mixture obtained amounts to about 210 g. per hour and is composed of about 90% $NaClO_2$ and 10% $NaCl$.

In all processes in which organic substances are employed for the reduction of chlorates or chloric acid to chlorine dioxide, the chlorine dioxide which is obtained always contains carbon dioxide regardless of what inert gas is employed in the process. In view of the presence of such carbon dioxide the evaporation of the chlorine dioxide adsorption liquid employed previously for the recovery of solid chlorite caused more or less carbonate to be present in the chlorite recovered. However, the chlorite obtained by the process according to the invention is substantially free of carbonates and, as chlorine dioxide is easily liberated from chlorites, the present process provides a solution for the problem of separating carbon dioxide from chlorine dioxide. The chlorite obtained according to the present process is also purer than that obtained by the previously employed evaporation processes as the heating during such evaporation caused decomposition products to be present therein. The present process therefore not only substantially simplifies the production of chlorine dioxide but also provides a purer product.

The process in accordance with the invention may be employed in combination with the procedures disclosed in copending applications S. N. 97,477, S. N. 97,478, and S. N. 97,479, entitled Process for the Preparation of Chlorine Dioxide, filed June 6, 1949, the latter now Patent No. 2,605,108.

I claim:

1. A cyclic process for the continuous production of a solid chlorite selected from the group consisting of alkali metal and alkaline earth metal chlorites which comprises absorbing chlorine dioxide in an aqueous absorption solution saturated with the desired chlorite and constantly containing an amount of an alkaline reacting compound of a metal corresponding to that of the desired chlorite and of a reducing agent for the chlorine dioxide in excess of that required to react with the absorbed chlorine dioxide while such absorption solution is passed through an absorption zone to form a supersaturated solution of the desired chlorite, continuously crystallizing and separating the excess chlorite in the resulting supersaturated solution after it has passed through the absorption zone while removing substantially only that water from the absorption solution as may be contained in the separated crystallized chlorite as water of crystallization; and, after replenishing the reducing agent, the alkaline reacting compound and the water consumed, recycling the absorption solution to the absorption zone for the absorption of further quantities of chlorine dioxide.

2. A process in accordance with claim 1 in which the temperature of the absorption solution in the absorption zone is maintained slightly above the temperature of the surrounding atmosphere.

3. A process in accordance with claim 1 in which the temperature of the absorption solution is maintained 5° C. to 10° C. above the temperature of the surrounding atmosphere.

4. A cyclic process for the continuous production of a solid chlorite selected from the group consisting of alkali metal and alkaline earth metal chlorites which comprises absorbing chlorine dioxide in an aqueous absorption solution saturated with the desired chlorite and constantly containing an amount of an alkaline reacting compound of a metal corresponding to that of the desired chlorite which is also a reducing agent for the chlorine dioxide in excess of that required to react with the absorbed chlorine dioxide while such absorption solution is passed through an absorption zone to form a supersaturated solution of the desired chlorite, continuously crystallizing and separating the excess chlorite in the resulting supersaturated solution after it has passed through the absorption zone while removing substantially only that water from the absorption solution as may be contained in the separated crystallized chlorite as water of crystallization and, after replenishing the alkaline reacting compound and the water consumed, recycling the absorption solution to the absorption zone for the absorption of further quantities of chlorine dioxide.

5. A cyclic process for the continuous production of solid sodium chlorite which comprises absorbing chlorine dioxide in an aqueous absorption solution saturated with sodium chlorite and constantly containing an amount of an alkaline reacting sodium compound and of a reducing agent for the chlorine dioxide in excess of that required to react with the absorbed chlorine dioxide while such absorption solution is passed through an absorption zone to form a supersaturated solution of sodium chlorite, continuously crystallizing and separating the excess sodium chlorite in the resulting supersaturated solution after it has passed through the absorption zone while removing substantially only that water from the absorption solution as may be contained in the separated crystallized chlorite as water of crystallization and, after replenishing the reducing agent, the alkaline reacting compound and the water consumed, recycling the absorption solution to the absorption zone for the absorption of further quantities of chlorine dioxide.

6. A process in accordance with claim 5 in which said alkaline reacting sodium compound is sodium hydroxide.

7. A process in accordance with claim 5 in which said alkaline reacting sodium compound is soda.

8. A cyclic process for the continuous production of solid sodium chlorite which comprises absorbing chlorine dioxide in an aqueous absorption solution saturated with sodium chlorite and constantly containing an amount of sodium peroxide in excess of that required to react with the absorbed chlorine dioxide while such absorption solution is passed through an absorption zone to form a supersaturated solution of sodium chlorite, continuously crystallizing and separating the excess sodium chlorite in the resulting supersaturated solution after it has passed through the absorption zone while removing substantially only that water from the absorption solution as may be contained in the separated crystallized chlorite as water of crystallization and, after replenishing the sodium peroxide and the water consumed, recycling the absorption solution to the absorption zone for the absorption of further quantities of chlorine dioxide.

9. A cyclic process for the continuous production of solid sodium chlorite which comprises absorbing chlorine dioxide in an aqueous absorption solution saturated with sodium chlorite and constantly containing an amount of sodium peroxide and hydrogen peroxide in excess of that required to react with the absorbed chlorine dioxide while such absorption solution is passed through an absorption zone to form a supersaturated solution of sodium chlorite, crystallizing and separating the excess chlorite in the resulting supersaturated solution after it has passed through the absorption zone while removing substantially only that water from the absorption solution as may be contained in the separated crystallized chlorite as water of crystallization and, after replenishing the sodium peroxide, the hydrogen peroxide and the water consumed, recycling the absorption solution to the absorption zone for the absorption of further quantities of chlorine dioxide.

10. A cyclic process for the continuous production of a solid chlorite selected from the group consisting of alkali metal and alkaline earth metal chlorites which comprises absorbing chlorine dioxide in an aqueous absorption solution saturated with the desired chlorite and constantly containing an amount of an alkaline reacting compound of a metal corresponding to that of the desired chlorite and of a reducing agent for the chlorine dioxide in excess of that required to react with the absorbed chlorine dioxide while such absorption solution is passed through an absorption zone to form a supersaturated solution of the desired chlorite, continuously cooling the supersaturated absorption solution after it has passed through the absorption zone, crystallizing and separating the excess chlorite from the cooled absorption solution while removing substantially only that water from the absorption solution as may be contained in the separated crystallized chlorite as water of crystallization and, after replenishing the reducing agent, the alkaline reacting compound and the water consumed, recycling the absorption solution to the absorption zone for the absorption of further quantities of chlorine dioxide.

ERNST WAGNER.

REFERENCES CITED

The following references are of record in the file of this patent:

UNITED STATES PATENTS

| Number | Name | Date |
| --- | --- | --- |
| 2,033,389 | Moose | Mar. 10, 1936 |
| 2,092,944 | Vincent | Sept. 14, 1937 |
| 2,092,945 | Vincent | Sept. 14, 1937 |
| 2,194,194 | Cunningham | Mar. 19, 1940 |
| 2,423,794 | Otto | July 8, 1947 |
| 2,424,207 | Otto | July 15, 1947 |

FOREIGN PATENTS

| Number | Country | Date |
| --- | --- | --- |
| 557,634 | Great Britain | Nov. 29, 1943 |

OTHER REFERENCES

J. W. Mellor's "Inorganic and Theoretical Chemistry," vol 2, pp. 282, 283. Longmans, Green & Co., N. Y.